(12) United States Patent
Nakagawa

(10) Patent No.: US 10,831,882 B2
(45) Date of Patent: Nov. 10, 2020

(54) DEVICE, PROGRAM AND METHOD FOR CALCULATING A NUMBER OF DAYS A PASSWORD IS USED

(71) Applicant: SHARP KABUSHIKI KAISHA, Sakai (JP)

(72) Inventor: Kanji Nakagawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 167 days.

(21) Appl. No.: 16/147,751

(22) Filed: Sep. 30, 2018

(65) Prior Publication Data
US 2019/0130095 A1    May 2, 2019

(30) Foreign Application Priority Data
Oct. 30, 2017    (JP) ................. 2017-209513

(51) Int. Cl.
  *G06F 21/46* (2013.01)
  *G06F 21/31* (2013.01)
  *G06F 3/0488* (2013.01)
  *G06F 3/0481* (2013.01)

(52) U.S. Cl.
  CPC .......... *G06F 21/46* (2013.01); *G06F 3/04886* (2013.01); *G06F 21/31* (2013.01); *G06F 3/04817* (2013.01)

(58) Field of Classification Search
  CPC .......... G06F 21/30; G06F 21/31; G06F 21/45; G06F 21/46; G06F 3/04886; G06F 3/04817; H04L 63/083
  See application file for complete search history.

(56) References Cited

U.S. PATENT DOCUMENTS

| | | | |
|---|---|---|---|
| 2004/0177272 A1* | 9/2004 | Walters | G06F 21/46 713/183 |
| 2008/0307235 A1 | 12/2008 | Keohane et al. | |
| 2010/0031343 A1* | 2/2010 | Childress | G06F 21/46 726/18 |
| 2016/0057128 A1* | 2/2016 | Johansson | H04L 63/102 726/4 |

FOREIGN PATENT DOCUMENTS

JP    2010-529544 A    8/2010

\* cited by examiner

*Primary Examiner* — Malcolm Cribbs
(74) *Attorney, Agent, or Firm* — ScienBiziP, P.C.

(57) ABSTRACT

An information processing device includes a display. A password input screen for a user to input a password is displayed on the display. When the password is input on the password input screen, the useful number-of-days of the input password is calculated according to a predetermined calculation condition. When the useful number-of-days of the password is calculated, a confirmation screen for allowing the user to confirm the useful number-of-days of the calculated password is displayed on the display.

8 Claims, 11 Drawing Sheets

US 10,831,882 B2

DEVICE, PROGRAM AND METHOD FOR CALCULATING A NUMBER OF DAYS A PASSWORD IS USED

BACKGROUND

1. Field

The present disclosure relates to a computing device, an information processing device, a control program, and a control method, and more particularly to a computing device, an information processing device, a control program, and a control method that calculate safety of a password.

2. Description of the Related Art

An example of this type of the related art is disclosed in Japanese Unexamined Patent Application Publication (Translation of PCT Application) No. 2010-529544. In Japanese Unexamined Patent Application Publication (Translation of PCT Application) No. 2010-529544, an example of a password security enhancement method of the related art is disclosed. In the password security enhancement method of the related art, when a user sets or changes a password, a safety level of an input password is calculated and the calculated safety level is presented to the user as a percentage value or three-stage assessment rating of "low", "intermediate", and "high".

However, in the password security enhancement method of the related art, since the safety level of the password of the related art is calculated uniformly by a predetermined computation formula, there is a case where safety is excessively requested for a user who intends to set a password that is valid only for a short period of time. On the other hand, if a computation formula that is appropriate for the user who intends to set the password that is valid only for a short period of time is used, for a user who intends to set a password that is valid for a long period of time, safety may not be sufficiently demanded and a password having low safety may be set.

As described above, in the password security enhancement method of the related art, there is a problem that management of a password compatible with convenience and safety may not be performed.

SUMMARY

It is desirable to provide a new computing device, information processing device, control program, and control method.

Furthermore, it is desirable to provide a computing device, information processing device, control program, and control method that can manage a password compatible with convenience and safety.

According to an aspect of the present disclosure, there is provided a computing device including an input unit, a calculation unit, and a presentation unit. The input unit receives an operation of a user. For example, the input unit is a touch panel, a keyboard, a computer mouse, and the like. The calculation unit calculates a useful number-of-days of a password, which is input by the operation of the user received by the input unit, according to a predetermined calculation condition. The presentation unit presents the useful number-of-days calculated by the calculation unit to the user.

According to another aspect of the present disclosure, there is provided a control program which is executed by a computer of a computing device including an input unit that receives an operation of a user, and causes the computer of the computing device to function as a calculation unit that calculates the useful number-of-days of the password, which is input by the operation of a user received by the input unit, according to a predetermined calculation condition and a presentation unit that presents the useful number-of-days calculated by the calculation unit to the user.

According to still another aspect of the disclosure, there is provided a control method of a computing device including an input unit that receives an operation of a user, and the control method includes, by a computer of the computing device, (a) calculating the useful number-of-days of the password, which is input by the operation of a user, received by the input unit, according to a predetermined calculation condition and (b) presenting the useful number-of-days calculated in the calculating (a) to the user.

The matters described above and other matters to be demanded, features, and advantages of the disclosure will become more apparent from the detailed description of the following examples which are to be referred to in the figures.

DESCRIPTION OF THE EMBODIMENTS

First Embodiment

Figure 1:
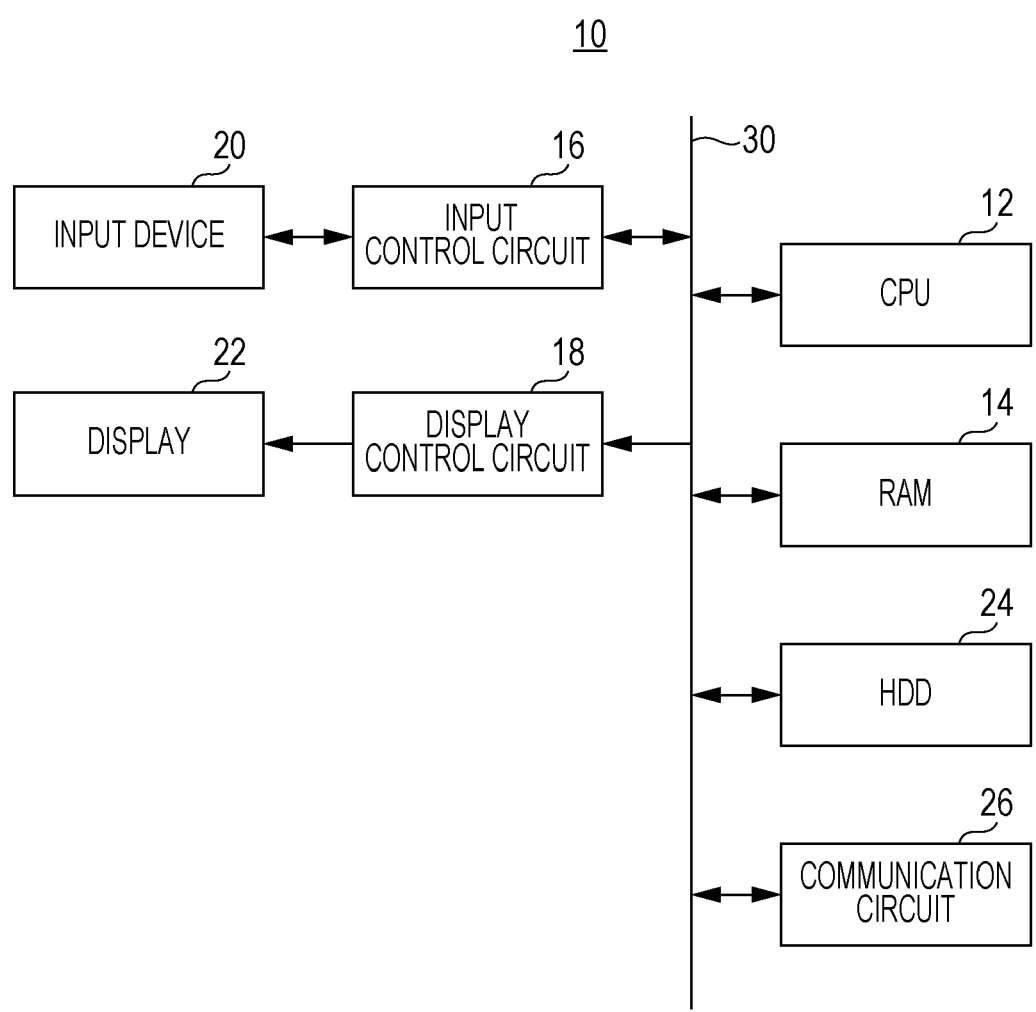
FIG. 1 is a block diagram illustrating an electrical configuration of an information processing device according to a first embodiment.

FIG. 1 is a block diagram illustrating an electrical configuration of the information processing device 10 of a first embodiment. However, the electrical configuration of an information processing device 10 illustrated in FIG. 1 is merely an example, and may not be limited thereto.

The information processing device 10 illustrated in FIG. 1 is a general purpose computer (terminal) to be used by a user. Specifically, the information processing device 10 corresponds to a desktop PC, a notebook PC (laptop PC), or a tablet PC.

Referring to FIG. 1, the information processing device 10 of the first embodiment includes a CPU 12. The CPU 12 is connected to a RAM 14, an input control circuit 16, a display control circuit 18, an HDD 24, and a communication circuit 26 via a bus 30. An input device 20 is connected to an input control circuit 16 and a display 22 is connected to the display control circuit 18. The display 22 is, for example, an LCD device. As the display 22, an organic EL device can also be used.

The input device 20 is, for example, a keyboard or/and a computer mouse, and in a case where the input device 20 is a keyboard, the input device 20 includes hardware operation buttons or operation keys. A touch panel may be used as the input device 20. In this case, any type of touch panel can be used, such as an electrostatic capacitance type. The touch panel may be provided on a display surface of the display 22 or may be provided separately from the display 22. However, a touch display in which the touch panel is integrated with the display 22 may be provided. In a case where the touch panel is provided, software keys such as various buttons and icons are displayed on the display 22.

For example, a software key refers to a key (icon) reproduced in software on the display surface of the display 22 with a touch panel, for example. In contrast, a hardware key refers to a key (button) provided as a physical device (for example, a keyboard).

The CPU 12 controls overall control of the information processing device 10. The RAM 14 is used as a work area and a buffer area of the CPU 12.

The input control circuit 16 outputs an operation signal or operation data corresponding to an operation of the input device 20 to the CPU 12. For example, in a case where the input device 20 is a keyboard, the input control circuit 16 outputs an operation signal or operation data corresponding to the operation of the operation button or the operation key to the CPU 12. In a case where the input device 20 is a touch panel, the input control circuit 16 applies a voltage to be supplied for the touch panel, and outputs touch coordinate data indicating the position of the touch input to the CPU 12 when a touch operation (touch input) within a touch effective range of the touch panel is detected.

The display control circuit 18 includes a GPU and a VRAM. Under the instruction of the CPU 12, the GPU generates screen data for displaying various screens in the VRAM using image generation data 74b (see FIG. 4) stored in the RAM 14 and outputs the generated screen data to the display 22.

The HDD 24 is a main storage device (storing unit) of the information processing device 10, and is a nonvolatile memory, and stores an operating system of the information processing device 10 and various application software, and stores various kinds of data such as image data. Other non-volatile storage media such as an EEPROM or flash memory may be used instead of the HDD 24 or with the HDD 24.

The communication circuit 26 is a wired communication circuit or a wireless communication circuit, and communicates with an external computer via a network such as the Internet, LAN or the like according to an instruction from the CPU 12.

In the information processing device 10 having such a configuration, for example, when a user sets or changes a password, the user may be presented with a safety level of an input password. The password is used to determine whether or not to use an information device or an electronic device whether access to the cloud service is allowed or not when a user uses the device or accesses the cloud service. For example, the user sets a password with reference to the safety level of the presented password.

However, in the information processing device of the related art, since the safety level of the password is uniformly calculated only by a predetermined computation formula, there is a case where safety is excessively requested for a user who intends to set a password that is valid only for a short period of time. On the other hand, if a computation formula suitable for a user who intends to set a password effective only for a short period of time is used, for a user who intends to set a password that is valid for a long period of time, safety may not be sufficiently demanded, and a password having low safety may be set.

As described above, in the information processing device of the related art, there is a problem that it is unable to manage a password that is compatible with convenience and safety.

Accordingly, in the information processing device 10 of the first embodiment, the useful number-of-days of the password input by the user is calculated and the useful number-of-days of the calculated password is presented to the user.

Figure 2:
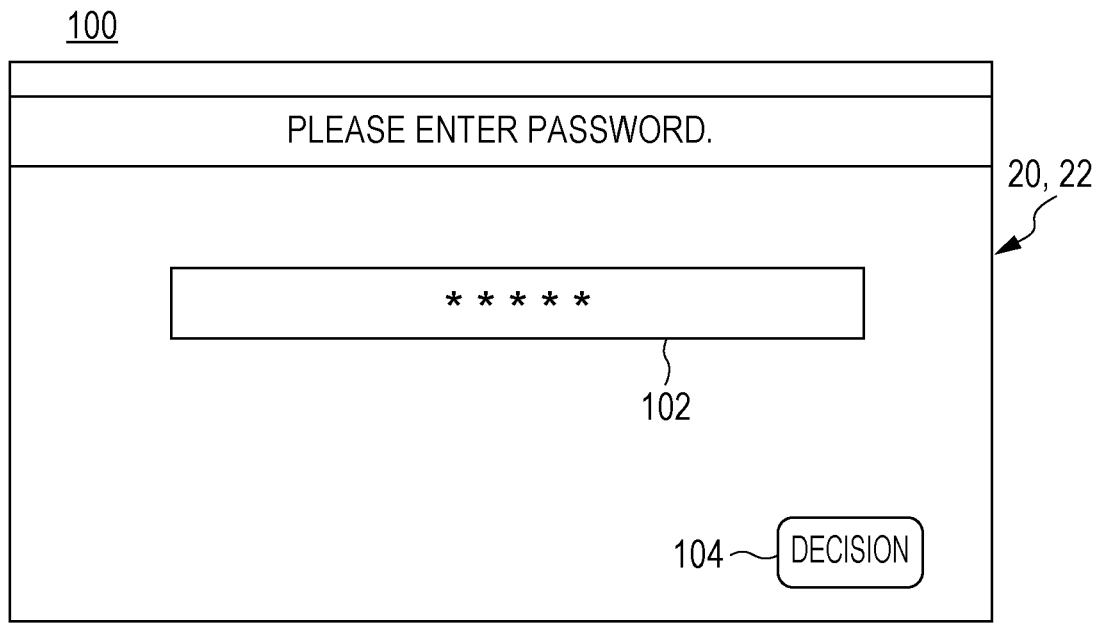
FIG. 2 is a diagram illustrating an example of a password input screen.
Figure 3:
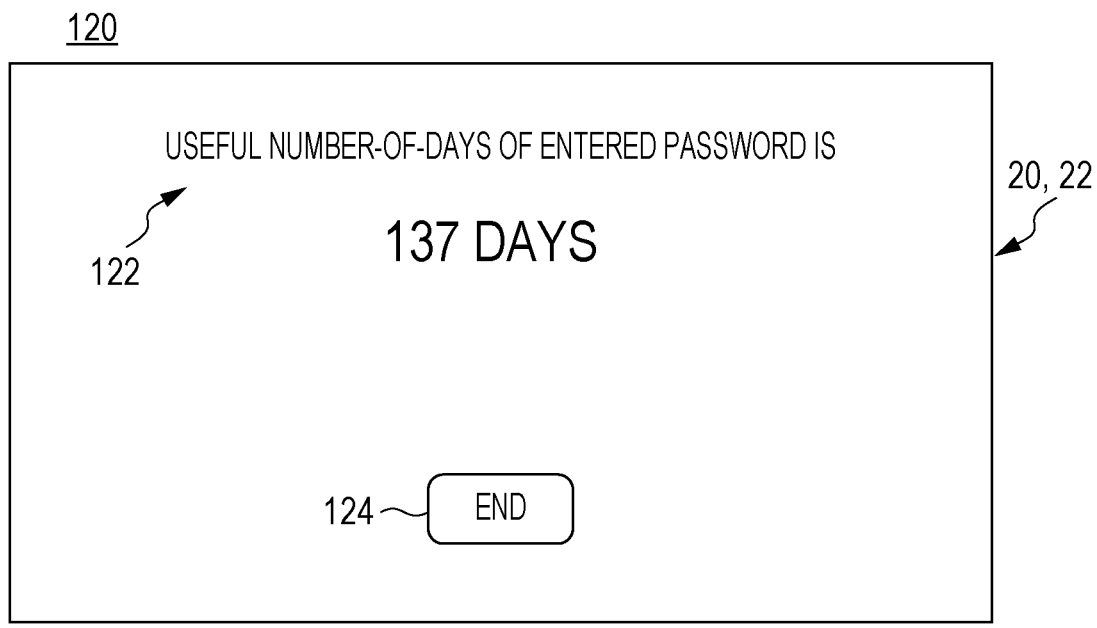
FIG. 3 is a diagram illustrating an example of a confirmation screen.

FIG. 2 is a diagram illustrating an example of a password input screen 100. FIG. 3 is a diagram illustrating an example of a confirmation screen 120.

In the following, an operation example of the information processing device 10 will be described with reference to FIGS. 2 and 3. First, when the user sets or changes the password, an application (useful number-of-days calculation application) for calculating the useful number-of-days of the password is executed in the information processing device 10. However, in the first embodiment, the password input in the useful number-of-days calculation application may not be actually used in the information processing device 10 or the like, and the application is executed even in a case of simply confirming the useful number-of-days of the password or the like.

When the useful number-of-days calculation application is executed in the information processing device 10, the password input screen 100 for the user to input a password is displayed on the display 22 as illustrated in FIG. 2.

On the password input screen 100, a message is displayed to prompt the user to input a password, and an input box 102 and a decision icon 104 are in addition to a message prompting the user to input a password.

In the input box 102, the password (character string) input by operating the input device 20 is reflected. In this embodiment, since the input device 20 is the keyboard as described above, the operation of the user is performed by pressing a hardware operation button or a hardware operation key provided on the keyboard.

However, in the input box 102, an asterisk (*) is displayed instead of an input character. As such, the input character itself is not displayed in this embodiment. This is to prevent the password from being seen by a third party by displaying the input password as it is. However, since the number of "*"s displayed according to the number of input characters is increased, the user can recognize the number of characters (number of digits) of the input (being input) password.

A decision icon 104 is a software key to which a function of determining the password input to the input box 102 as a password for calculation calculating the useful number-of-days assigned. When the decision icon 104 is selected (touched), the useful number-of-days of the password for calculation input to the input box 102 is calculated. However, the decision icon 104 is validated when the number of characters input to the input box 102 is at least three characters or more. On the other hand, in a case where the number of characters input to the input box 102 is less than three characters (two characters or less), the decision icon 104 is invalidated and is not selected even if the decision icon 104 is touched. Accordingly, in a case where the number of characters input to the input box 102 is less than three characters, it is not possible to calculate the useful number-of-days of the password. This is because, in a case where the input password is less than three characters, the number of characters is too small to properly calculate the useful number-of-days of the password.

When the decision icon 104 is selected in the password input screen 100 and the useful number-of-days of the password input to the input box 102 is calculated, the confirmation screen 120 for confirming the calculation result by the user is displayed on the display 22 as illustrated in FIG. 3.

On the confirmation screen 120, an end icon 124 is displayed in addition to a message 122 indicating the useful number-of-days of the password.

For example, on the confirmation screen 120, the message 122 indicating the useful number-of-days of the password, such as "the useful number-of-days of for the input password is 137 days." is displayed. By means of this message 122, the useful number-of-days of the password input on the password input screen 100 is presented to the user. For that reason, the user can recognize the useful number-of-days of the password input by the user. In the message 122, a size of characters in a portion indicating the useful number-of-days is made larger than the size of the character in the other portion. This is because making the size of the characters larger makes it easier for the user to recognize the useful number-of-days of the password. However, the content of the message 122 displayed on the confirmation screen 120 is an example and can be randomly changed. This also applies to messages 142, 162, 182, 202, and 222 on other screens to be described later.

The end icon 124 is a software key to which the function of ending the useful number-of-days calculation application is assigned. When the end icon 124 is selected, a password setting application ends, and a home screen or the like for selecting various functions executable by the information processing device 10 is displayed on the display 22.

Next, a method of obtaining the useful number-of-days of the password will be described. A useful number-of-days VP of the password is calculated by a calculation equation represented in Expression 1.

$$VP=NC/SS \times SC \qquad \text{Expression 1}$$

Next, in Expression 1, the "NC" is the number of search candidates, the "SS" is a search speed, and the "SC" is a safety coefficient. That is, in Expression 1, by dividing the number of search candidates NC by the search speed SS and multiplying by the safety coefficient SC, the useful number-of-days VP of the password is calculated.

Next, the number NC of search candidates is calculated by Expression 2.

$$NC=M^n \qquad \text{Expression 2}$$

In Expression 2, the "M" is the number of character candidates included the password and the "n" is the number of characters of the password. The number M of character candidates is determined according to a type (character type) of character that can be used for the password. For example, in a case where the character type that can be used for the password is a lowercase alphabet, an uppercase alphabet, and numerals (Arabic numerals), the number M of character candidates is "62". The number n of characters of the password is determined according to the number of characters of the password input by the user.

For example, if the password is composed only of lowercase alphabets, the number M of character candidates is "26". If the number of characters of this password is five characters, the number of characters n of the password is "5". In this case, the number of search candidates NC is "11881376".

In a case where a password having a low safety composed of a specific character string is registered in advance and the password having the low safety is made unusable, the number of search candidates NC may be a number obtained by subtracting the number of passwords having the low safety from the number calculated by the calculation formula represented in Expression 2. For example, a password having low safety corresponds to a password composed of a character string corresponding to a word described in a dictionary (dictionary) or a character string corresponding to a file name in various applications executed by the information processing device 10 or a word or the like in a document, or the like.

The search speed SS is calculated by Expression 3.

$$SS=1440 \times NT/LT \qquad \text{Expression 3}$$

In Expression 3, the "NT" is the number of trials until locked for a predetermined period of time and the "LT" is the time (lock time) locked in a case where a password is erroneously input a predetermined number of times (number of trials) consecutively. However, the lock time LT is in units of minutes. In addition, in Expression 3, "1440" is a number corresponding to the length of one day in units of minutes. That is, in Expression 3, as the search speed SS, the number of passwords that can be searched per day (the number of searches per day) is calculated.

In this embodiment, the number of trials NT and the lock time LT are set in advance. For example, in a case where the password is locked for five minutes with three times of an erroneous input of a password, the number of trials NT is set to "3" and the lock time LT is set to "5".

The safety coefficient SC is set in advance. For example, in a case where the safety coefficient SC is set to 1% (numerical value in the calculation formula is 0.01), the number of days used in order to try 1% of the number of search candidates NC is calculated as the useful number-of-days VP of the password. That is, if the safety coefficient SC is set to 1%, the number of days with the probability of successful search becomes 1% becomes the useful number-of-days VP of the password.

The operation as described above of the information processing device 10 is realized by executing an information processing program stored in a RAM 14 by the CPU 12. Specific processing will be described later using a flowchart.

Figure 4:
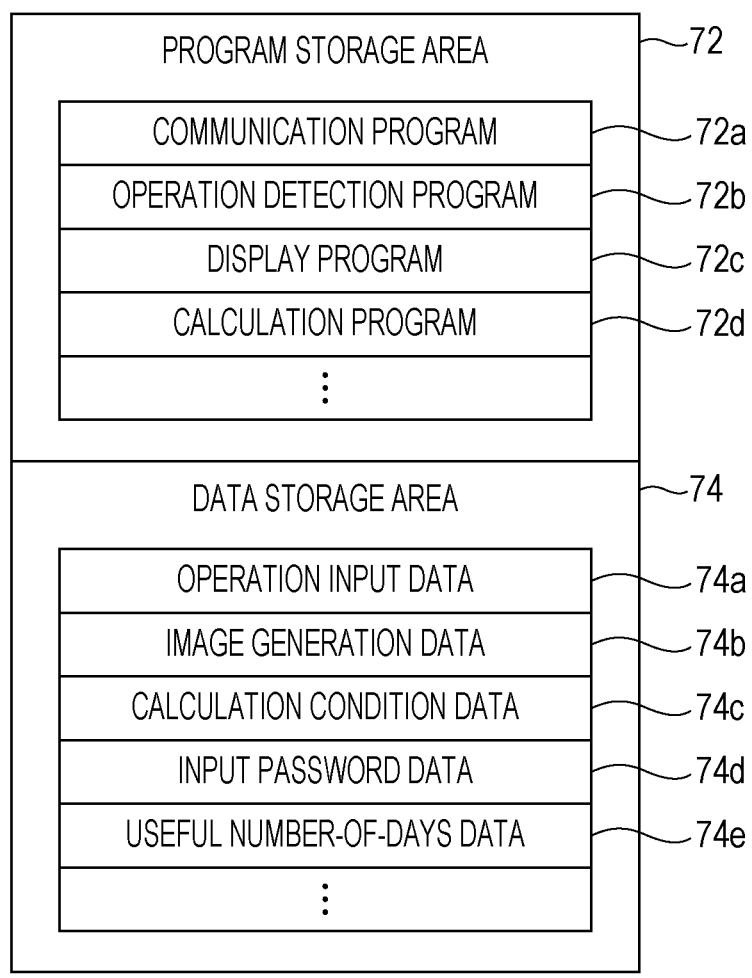
FIG. 4 is a diagram illustrating an example of a memory map of the RAM illustrated in FIG. 1.

FIG. 4 is a diagram illustrating an example of a memory map 70 of the RAM 14 of the information processing device 10 illustrated in FIG. 1. As illustrated in FIG. 4, the RAM 14 includes a program storage area 72 and a data storage area 74. In the program storage area 72, as described above, the information processing program is stored. This information processing program includes a communication program 72a, an operation detection program 72b, a display program 72c, and a calculation program 72d.

The communication program 72a is a program for communicating with an external computer via a communication circuit 26.

The operation detection program 72b is a program for acquiring an operation signal (operation data) output from the input control circuit 16 in response to the operation of the input device 20. Further, in a case where a touch panel is provided as the input device 20, the operation detection program 72b is also a program for acquiring touch coordinate data output from the input control circuit 16. The CPU 12 determines whether or not various buttons and icons included in various screens displayed on the display 22 are operated in accordance with the operation data or the touch coordinate data acquired by the operation detection program 72b.

The display program 72c is a program for generating display image data corresponding to various screens displayed on the display 22 such as a password input screen 100 and the confirmation screen 120 by using image generation data 74b to be described later and outputting the display image data to the display 22.

The calculation program 72d is a program for calculating the useful number-of-days of the password according to Expressions 1 to 3, depending on the password for calculation which is input on the password input screen 100.

Although not illustrated, in the program storage area 72, programs such as other application programs or a sound output program are also stored.

In the data storage area 74 of the RAM 14, operation input data 74a, image generation data 74b, calculation condition data 74c, password data for calculation 74d, and useful number-of-days data 74e are stored.

The operation input data 74a is, for example, operation data or/and touch coordinate data detected (acquired) according to the operation detection program 72b. The detected operation data and/or touch coordinate data are stored in time series.

The image generation data 74b is data such as polygon data or texture data for generating display image data corresponding to various screens such as the password input screen 100 and the confirmation screen 120 displayed on the display 22. Further, the image generation data 74b also includes image data of a software key and the like.

The calculation condition data 74c is data on the calculation formulas for calculating the useful number-of-days of the password in Expressions 1 to 3. Specifically, the calculation condition data 74c is data on the safety coefficient, the number of trials and the lock time, and the like.

The calculation password data 74d is data on the password for calculation which is input on the password input screen 100.

The-useful number-of-days data 74e is data on the useful number-of-days of the password calculated according to the calculation program 72d.

Although not illustrated, in the data storage area 74, other data used for execution of the information processing program is stored, and a timer (counter) and a register used for execution of the information processing program are provided.

Figure 5:
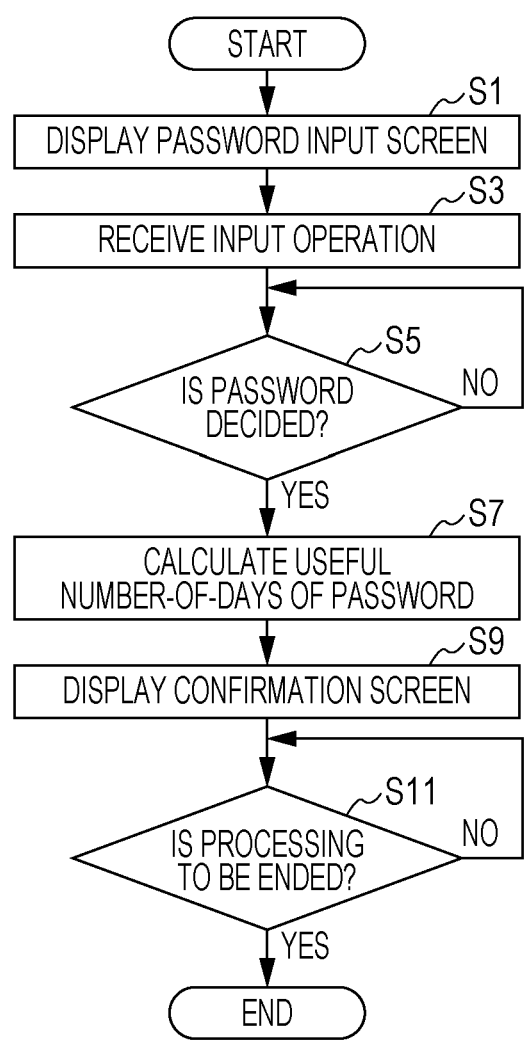
FIG. 5 is a flowchart illustrating an example of information processing of the CPU illustrated in FIG. 1.

FIG. 5 is a flowchart illustrating an example of information processing of the CPU 12 of the information processing device 10 illustrated in FIG. 1. As illustrated in FIG. 5, when information processing is started, the CPU 12 displays the password input screen 100 on the display 22 in step S1, receives the input operation in step S3, and proceeds to step S5. In step S3, the display content of the password input screen 100 (display content of the input box 102) is changed according to the input operation by the user.

In step S5, it is determined whether or not to decide the input password as a password for calculation. That is, in step S5, it is determined whether or not a password for calculation is decided. Here, it is determined whether or not the decision icon 104 is selected on the password input screen 100.

When the determination result in step S5 is "NO", that is, in a case where the password for calculation is not decided, processing returns to the same step S5. On the other hand, when the determination result in step S5 is "YES", that is, in a case where the password for calculation is decided, the useful number-of-days of the password is calculated in step S7. Then, the confirmation screen 120 is displayed on the display 22 in step S9, and it is determined whether or not processing is to be ended in step S11. Here, it is determined whether or not the end icon 124 is selected on the confirmation screen 120.

When the determination result in step S11 is "NO", that is, in a case where the end icon 124 is not selected, processing returns to the same step S11. On the other hand, when the determination result in step S11 is "YES", that is, in a case where the end icon 124 is selected, information processing is ended.

According to the first embodiment, since the useful number-of-days of the password input by the user is calculated and the calculated useful number-of-days of the password is presented to the user, the user can recognize the useful number-of-days of the password input by the user himself/herself. Then, the user can determine whether to use the password by comparing the useful number-of-days of the password with a period that he/she wishes to use. As such, according to the first embodiment, it is possible to manage the password that is compatible with convenience and safety by using the useful number-of-days of the password.

In the first embodiment, in a case where the decision icon 104 is selected on the password input screen 100, the calculated useful number-of-days of the password is presented to the user, but the disclosure is not limited thereto. For example, it is also possible to present (feedback) to the user the useful number-of-days of the password being input on the password input screen 100. In this case, in a case where the number of characters input to the input box 102 is three or more characters, a message indicating the useful number-of-days of the password being input is displayed on the password input screen 100. By doing as described above, the user can recognize the useful number-of-days of the password being input and thus, it is possible to set an appropriate password according to a desired use period of the password.

Second Embodiment

Since the information processing device 10 of a second embodiment is the same as the information processing device 10 of the first embodiment except that the password is registered when the lower limit number-of-days of the useful number-of-days of the password is set and the useful number-of-days of the password reaches the lower limit number-of-days, contents different from those of the first embodiment will be described, and redundant description will be omitted.

Figure 6:
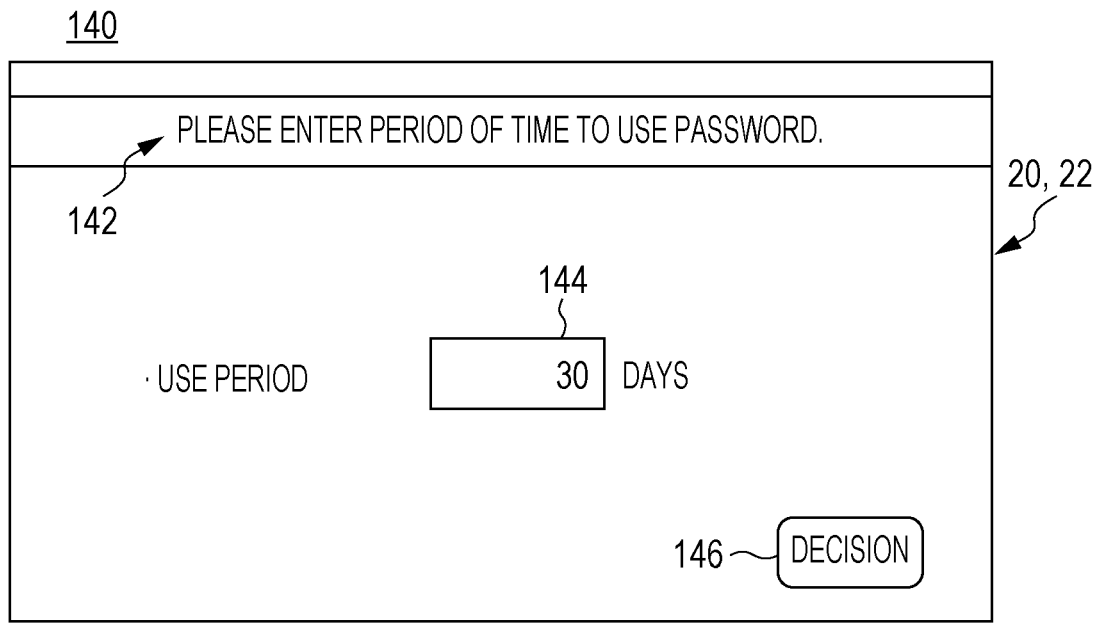
FIG. 6 is a diagram illustrating an example of a use period input screen according to a second embodiment.

FIG. 6 is a diagram illustrating an example of a use period input screen 140 according to the second embodiment. FIG.

Figure 8:
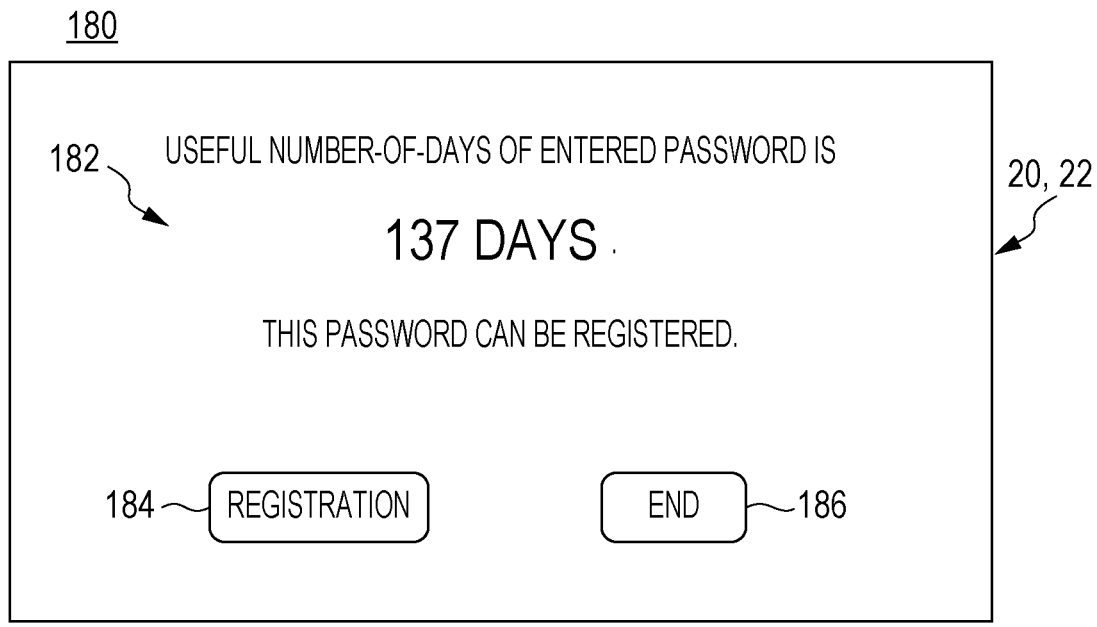
FIG. 8 is a diagram illustrating an example of a registration screen according to the second embodiment.
Figure 9:
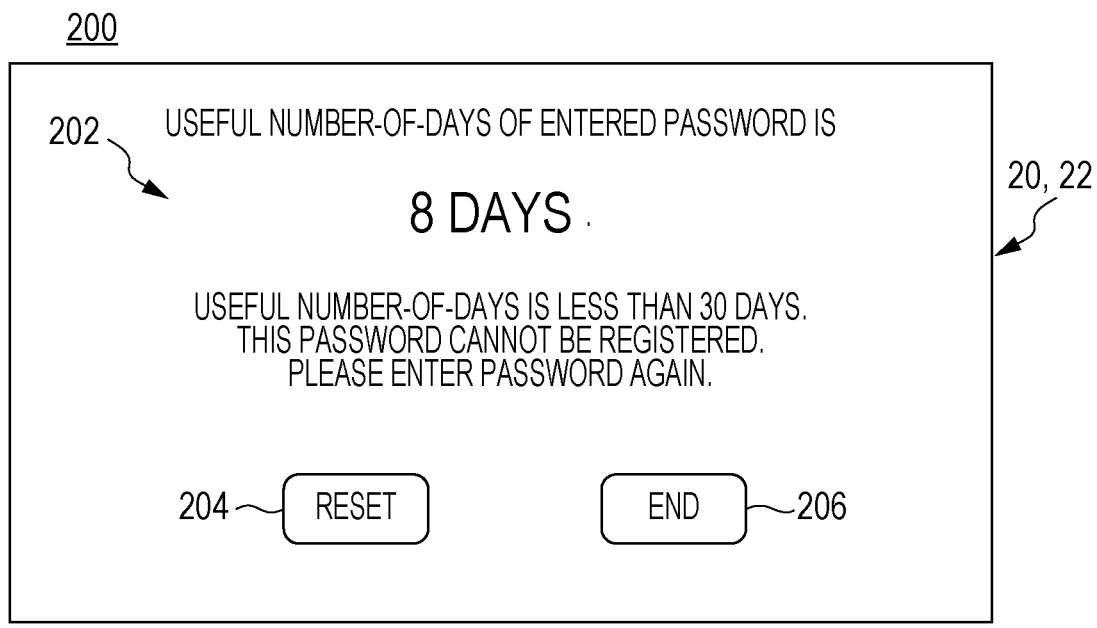
FIG. 9 is a diagram illustrating an example of an informing screen according to the second embodiment.

7 is a diagram illustrating an example of a calculation condition input screen 160 according to the second embodiment. FIG. 8 is a diagram illustrating an example of a registration screen 180 according to the second embodiment. FIG. 9 is a diagram illustrating an example of an informing screen 200 according to the second embodiment.

First, in the second embodiment, a password registration application is executed to register a password in the information processing device 10. When this password registration application is executed, a password for registration is input by a user's input operation, and when the password for registration satisfies a predetermined condition, the password for registration is registered. The registered password is used as a password used for user authentication for using the information processing device 10 or as a password for logging in to a cloud service and the like that can be used via the information processing device 10.

However, the lower limit number-of-days of the useful number-of-days of the password which is a condition for deciding whether or not to register a password is set in advance. In this second embodiment, the user is allowed to input a use period of the password before the password for registration is input, and the input use period of the password is set as the lower limit number-of-days.

For example, when the password registration application is executed, the use period input screen 140 for setting the password use period is displayed on the display 22 as illustrated in FIG. 6.

On the use period input screen 140, an input box 144 and a decision icon 146 are displayed in addition to a message 142 for prompting the user to input the use period of the password.

In the input box 144, the number of days corresponding to the number input by operating the input device 20 is reflected.

The decision icon 146 is a software key to which the function of deciding the number of days input to the input box 144 as the use period use period of the password is assigned. When the decision icon 146 is selected, the use period of the password is decided according to the number input to the input box 144. That is, the lower limit number-of-days of the useful number-of-days of the password is decided according to the number input in the input box 144. In the example illustrated in FIG. 6, "30" is displayed as the number of days in the input box 144. When the decision icon 146 is selected in this state, the use period of the password is set to 30 days. That is, the lower limit number-of-days of the useful number-of-days of the password is set to 30 days.

Figure 7:
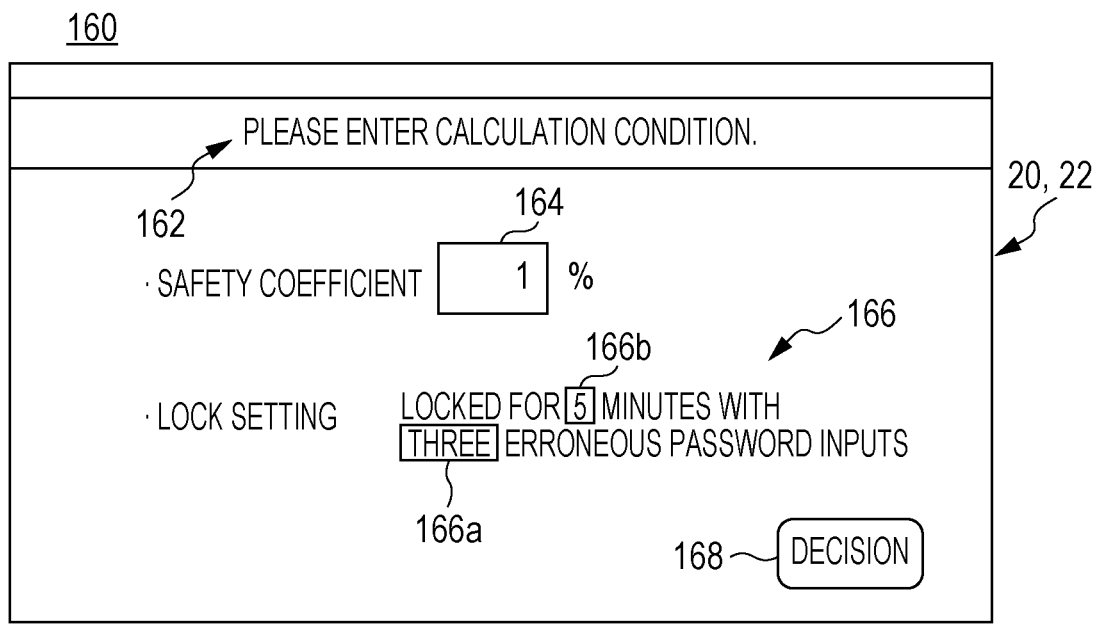
FIG. 7 is a diagram illustrating an example of a calculation condition input screen according to the second embodiment.

When the decision icon 146 is selected on the use period input screen 140 and the lower limit number-of-days of the useful number-of-days of the password is decided, the calculation condition input screen 160 for setting the calculation condition of the useful number-of-days of the password is displayed on the display 22, as illustrated in FIG. 7.

On the calculation condition input screen 160, in addition to a message 162 for prompting the user to input the calculation condition of the useful number-of-days of the password, an input box 164 for inputting a safety coefficient, an input box 166 for inputting a lock setting, and a decision icon 168 are displayed.

In the input box 164 for inputting the safety coefficient, the number input by operating the input device 20 is reflected. However, the number input to the input box 164 is not the safety coefficient itself, but indicates a percentage (%) corresponding to the safety coefficient. In the example illustrated in FIG. 7, "1" is displayed as the ratio corresponding to the safety coefficient in the input box 164. In a case where the ratio corresponding to the safety coefficient is 1%, the safety coefficient is set to 0.01. The safety coefficient set here corresponds to the safety coefficient SC in the Expression 1 described above.

The input box 166 for inputting the lock setting includes an input box 166a for inputting the number of trials until it is locked for a predetermined time and an input box 166b for inputting the lock time. In each of the input box 166a and the input box 166b, the number input by operating the input device 20 is reflected. In the example illustrated in FIG. 7, "3" is displayed as the number of trials in the input box 166a. "5" is displayed as the lock time in the input box 166b. That is, in the example illustrated in FIG. 7, a case where it is locked for 5 minutes with three erroneous password inputs is illustrated. The number of trials set here corresponds to the number of trials NT in Expression 2 described above. Also, the lock time set here corresponds to the lock time LT in Expression 2 described above.

The decision icon 168 is a software key to which the function of deciding the calculation condition of the useful number-of-days of the password which is set on the use period input screen 140 is assigned. When the decision icon 168 is selected, the safety coefficient SC is decided according to the number input to the input box 164, the number of trials NT is decided according to the number input to the input box 166a, and the lock time LT is decided according to the number input to the input box 166b.

When the decision icon 168 is selected on the calculation condition input screen 160 and the calculation conditions for the useful number-of-days of the password are decided, the password input screen 100 illustrated in FIG. 2 is displayed on the display screen 22. In the password input screen 100, the contents of the operation of the information processing device 10 on the password input screen 100 are the same as those in the first embodiment, and the description thereof will be omitted.

In the second embodiment, when the decision icon 104 is selected in the password input screen 100 and the useful number-of-days of the password is calculated, it is determined whether or not the calculated useful number-of-days of the password reaches the lower limit number-of-days of the useful number-of-days of the password (greater than or equal to the lower limit number-of-days). When the useful number-of-days of the password reaches the lower limit number-of-days of the useful number-of-days of the password, the registration screen 180 as illustrated in FIG. 8 is displayed on the display 22.

On the registration screen 180, a registration icon 184 and an end icon 186 are displayed in addition to a message 182 indicating that the useful number-of-days of the password and the password can be registered.

For example, on the registration screen 180, a message 182 such as "The useful number-of-days of the input password is 137 days" and "This password can be registered." Are displayed. With this message 182, matters that the useful number-of-days of the password input on the password input screen 100 and the password can be registered are presented to the user.

The registration icon 184 is a software key to which the function of registering the password input on the password input screen 100 and ending the password registration application is assigned. When the registration icon 184 is selected, the password input on the password input screen 100 is registered, and the password registration application is ended.

The end icon 186 is a software key to which the function of ending the password registration application is assigned.

However, when the end icon 186 is selected, the password input on the password input screen 100 is not registered and the password registration application is ended.

In the second embodiment, in a case where the useful number-of-days of the password does not reach the lower limit number-of-days of the useful number-of-days of the password, the informing screen 200 illustrated in FIG. 9 is displayed on the display 22.

On the informing screen 200, a reset icon 204 and an end icon 206 are displayed, in addition to the useful number-of-days of the password, the message 202 indicating that the password may not be registered, and that the password is to be reset.

On the informing screen 200, the message 202 such as "The useful number-of-days of the input password is 8 days." and "The useful number-of-days is less than 30 days. This password may not be registered. Please input the password again." is displayed. With this message 202, matters that the useful number-of-days of the password input on the password input screen 100 and the password may not be registered are presented to the user.

The reset icon 204 is a software key to which a function of returning to the password input screen 100 is assigned. When the reset icon 204 is selected, the password input screen 100 is displayed on the display 22 and a password can be input.

The end icon 206 is a software key to which a function of ending the password registration application is assigned. However, when the end icon 206 is selected, the password input on the password input screen 100 is not registered and the password registration application is ended.

When the password registration application is ended, the use period of the password (lower limit number-of-days of the useful number-of-days of the password) and the calculation condition of the useful number-of-days of the password are erased (initialized).

Figure 10:
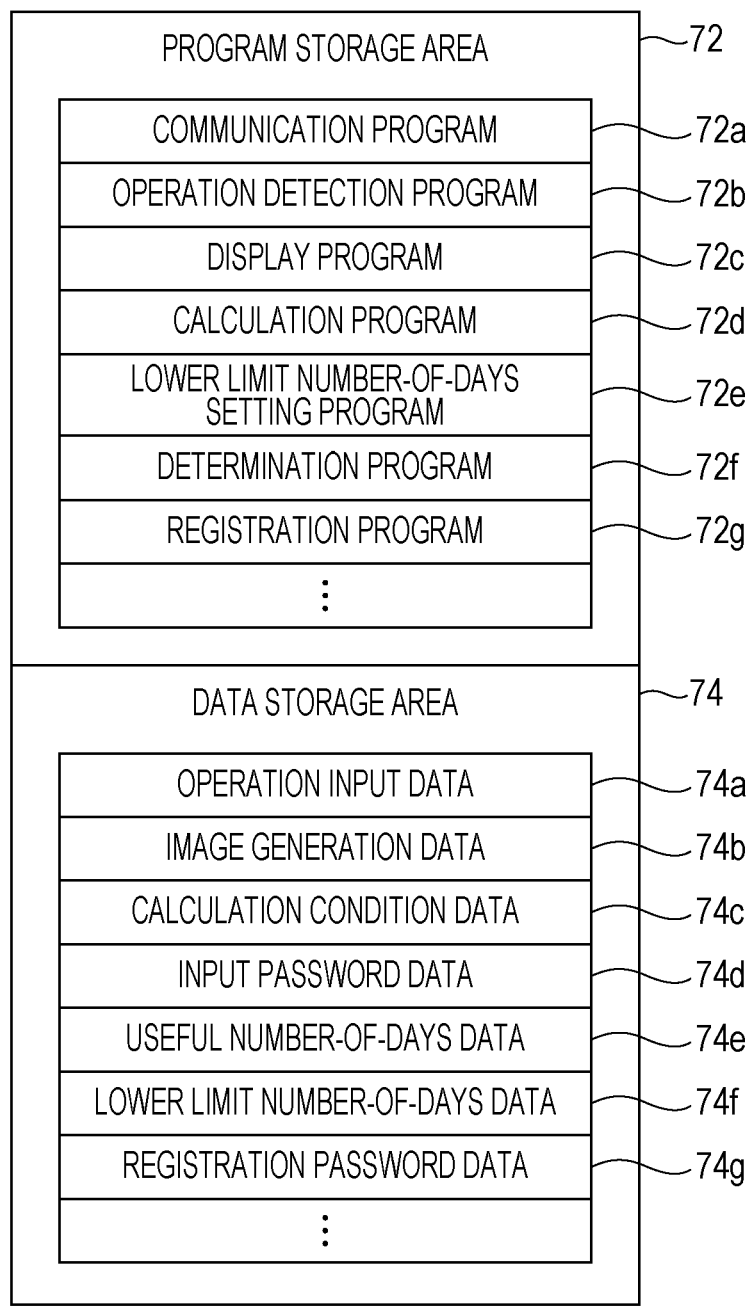
FIG. 10 is a diagram illustrating an example of a memory map of the RAM according to the second embodiment.

FIG. 10 is a diagram illustrating an example of a memory map 70 of the RAM 14 according to the second embodiment. As illustrated in FIG. 4, the information processing program is stored in the program storage area 72 of the RAM 14 as described above. The information processing program includes the communication program 72*a*, the operation detection program 72*b*, the display program 72*c*, the calculation program 72*d*, a lower limit number-of-days setting program 72*e*, a determination program 72*f*, and a registration program 72*g*. Since the communication program 72*a*, the operation detection program 72*b*, the display program 72*c*, and the calculation program 72*d* are the same as those in the first embodiment, the description thereof will be omitted.

The lower limit number-of-days setting program 72*e* is a program for setting the lower limit number-of-days of the useful number-of-days of the password. For example, the CPU 12 sets the use period of the password input on the use period input screen 140 as the lower limit number-of-days of the useful number-of-days of the password according to the lower limit number-of-days setting program 72*e*.

The determination program 72*f* is a program for determining whether or not the useful number-of-days of the password reaches the lower limit number-of-days of the useful number-of-days of the password by comparing the useful number-of-days of the password with the lower limit number-of-days of the password.

The registration program 72*g* is a program for registering the password input on the password input screen 100 in a case where it is determined that the useful number-of-days of the password reaches the lower limit number-of-days of the useful number-of-days of the password.

In the data storage area 74 of the RAM 14, the operation input data 74*a*, the image generation data 74*b*, the calculation condition data 74*c*, the calculation password data 74*d*, the useful number-of-days data 74*e*, lower limit number-of-days data 74*f*, and registration password data 74*g* are stored. The operation input data 74*a*, the image generation data 74*b*, the calculation condition data 74*c*, the password data for calculation 74*d*, and the useful number-of-days data 74*e* are the same as those in the first embodiment and thus, the description thereof will be omitted.

The lower limit number-of-days data 74*f* is data on the lower limit number-of-days of the useful number-of-days of the password which is set in accordance with the lower limit number-of-days setting program 72*e*.

The registration password data 74*g* is data on the password registered by the registration program 72*g*.

Figure 11:
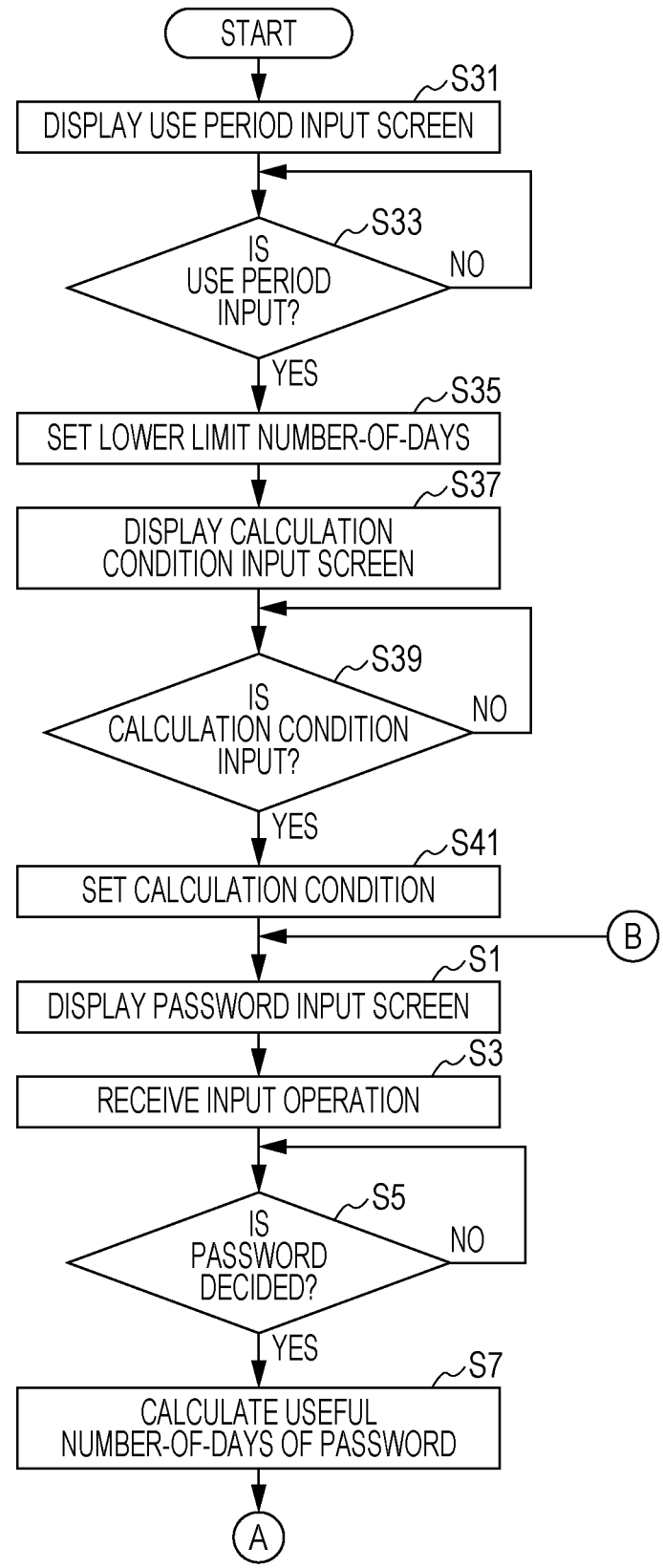
FIG. 11 is a flowchart illustrating a part of an example of information processing according to the second embodiment.
Figure 12:
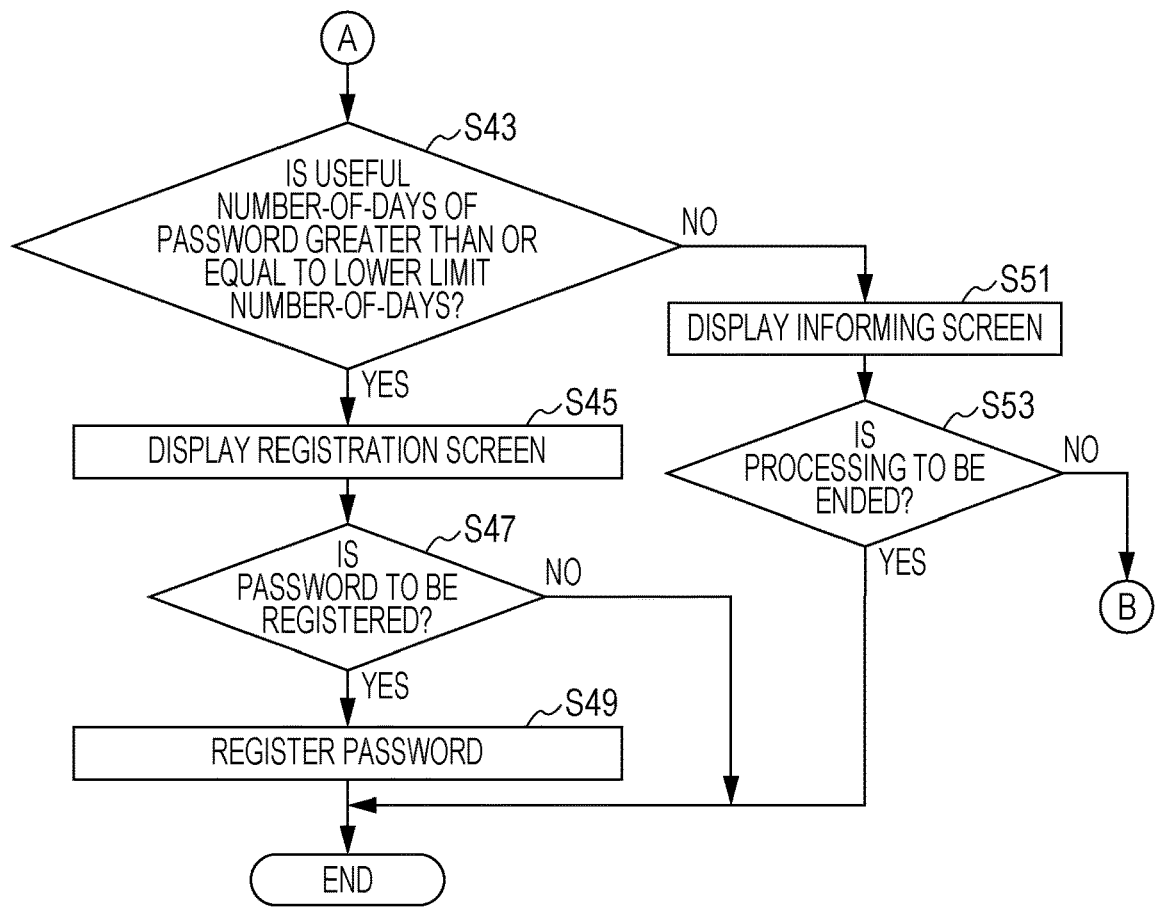
FIG. 12 is a flowchart illustrating another part of the information processing according to the second embodiment, which follows FIG. 11.

FIG. 11 is a flowchart illustrating a part of an example of information processing of the CPU 12 of the information processing device 10 according to the second embodiment. FIG. 12 is a flowchart illustrating another part of the information processing of the CPU 12 of the information processing device 10 according to the second embodiment, which follows FIG. 11. In the following, although information processing of the information processing device 10 in the second embodiment will be described with reference to the flowchart, the same reference numerals are given to the same processing as the information processing described in the first embodiment, and the description of the redundant contents will be omitted or briefly made.

As illustrated in FIG. 11, when information processing is started, the CPU 12 displays the use period input screen 140 on the display 22 in step S31 and determined whether or not the use period of the password is input in step S33. Here, it is determined whether or not the decision icon 146 is selected after the use period of the password is input, in the use period input screen 140.

When the determination result in step S33 is "NO", that is, in a case where the use period of the password is not input, processing returns to step S33. On the other hand, when the determination result in step S33 is "YES, that is, in a case where the use period of the password is not input, the use period of the input password is set as the lower limit number-of-days of the useful number-of-days of the password in step S35, and the calculation condition input screen 160 is displayed on the display 22 in step S37, and it is determined whether or not a calculation condition for the useful number-of-days of the password is input in step S39. Here, on the calculation condition input screen 160, it is determined whether or not the decision icon 168 is selected after the calculation condition of the useful number-of-days of the password is input.

When the determination result in step S39 is "NO", that is, in a case where the calculation condition of the useful number-of-days of the password is not input, processing returns to the same step S39. On the other hand, when the determination result in step S39 is "YES", that is, in a case where the calculation condition of the useful number-of-days of the password is input, the calculation condition of the useful number-of-days of the password is set in step S41, and processing proceeds to step S1. The contents of processing from step S1 to step S7 are the same as those of the first embodiment and thus, description thereof will be omitted.

Then, when the useful number-of-days of the password is calculated in step S7, processing proceeds to step S43 illustrated in FIG. 12. In step S43, it is determined whether or not the calculated useful number-of-days of the password reaches the lower limit number-of-days of the useful number-of-days of the password.

When the determination result in step S43 is "YES", that is, in a case where the calculated useful number-of-days of the password reaches the lower limit number-of-days of the useful number-of-days of the password, the registration screen 180 is displayed on the display 22 in step S45 and it is determined whether or not to register the password in step S47. Here, on the registration screen 180, it is determined whether or not either the registration icon 184 or the end icon 186 is selected.

When the determination result in step S47 is "YES", that is, in a case where the password is to be registered, the password is registered in step S49 and information processing is ended. On the other hand, when the determination result in step S47 is "NO", that is, in a case where the password is not to be registered, information processing is ended without registering the password.

When the determination result in step S43 is "NO", that is, in a case where the calculated useful number-of-days of the password does not reach the lower limit number-of-days of the useful number-of-days of the password, the informing screen 200 is displayed on the display 22 in step S51, and it is determined whether or not to end information processing in step S53. Here, it is determined, on the informing screen 200, whether or not the reset icon 204 is selected or whether or not the end icon 206 is selected.

When the determination result in step S53 is "YES", that is, in a case of ending processing, information processing is ended. On the other hand, when the determination result in step S53 is "NO", that is, in a case where the password is to be reset without ending processing, processing returns to step S1 and the password input screen 100 is displayed on the display 22.

According to the second embodiment, since the calculation condition of the useful number-of-days of the password can be set, the useful number-of-days of the password can be calculated appropriately according to a use situation of the password.

According to the second embodiment, since the password input on the password input screen 100 can be registered, management of the password compatible with convenience and safety can be performed on the password actually used.

Furthermore, according to the second embodiment, since it is possible to set a lower limit number-of-days of the useful number-of-days of the password, which is a condition for deciding whether or not to register a password, in advance, it is possible to decide whether or not to appropriately register the password, depending on the period during which the password is used. For example, in a case where a password to be used only for one day is set in maintenance of the information processing device 10, it is possible to prevent an excessive demand for safety by setting the lower limit number-of-days of the useful number-of-days of the password to a smaller number of days (for example, one day). On the other hand, in a case where a password to be used for a long period (for example, 180 days) is set, it is possible to prevent setting of a password having a low level of safety by setting the lower limit number-of-days of the useful number-of-days of the password to be equal to or greater than the use period.

In the second embodiment, although the lower limit number-of-days of the useful number-of-days of the password is set according to the operation of the user, the disclosure is not limited thereto. For example, the lower limit number-of-days of the useful number-of-days of the password may be set in advance depending on the situation in which the password is used.

In the second embodiment, although the password is registered in a case where the useful number-of-days of the password is equal to or greater than the lower limit number-of-days, the disclosure is not limited thereto. For example, even if the useful number-of-days of the password is less than lower limit number-of-days, the user may be informed that the useful number-of-days of the password does not reach the lower limit number-of-days of the useful number-of-days of the password so that the password can be registered.

Third Embodiment

Since the information processing device 10 of a third embodiment is the same as the information processing device 10 of the second embodiment except that the update date of expiration of time limit of the registered password is set, contents different from those of the second embodiment will be described, and redundant description will be omitted.

Figure 13:
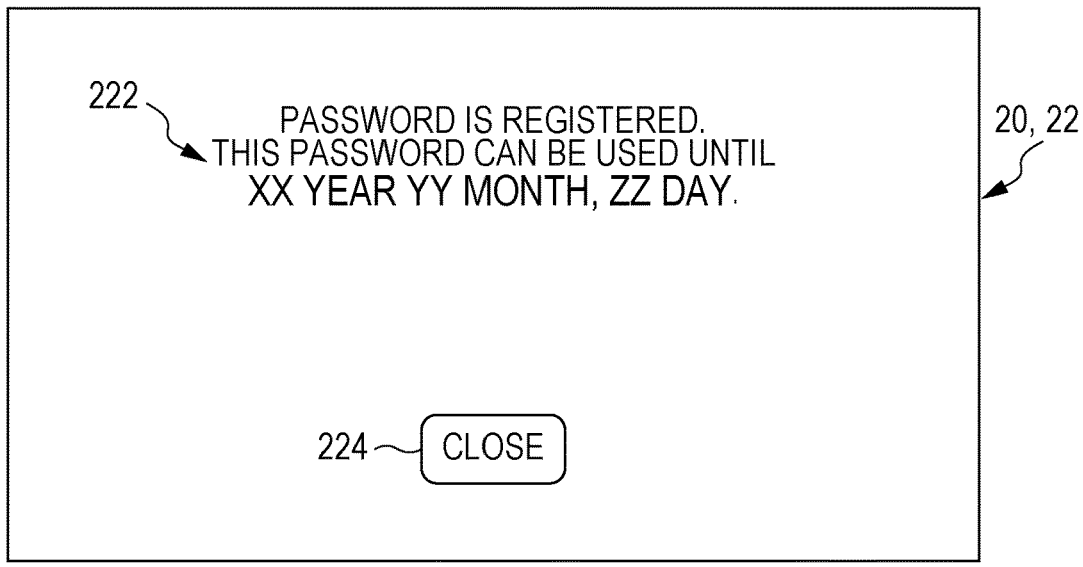
FIG. 13 is a diagram illustrating an example of an update time limit confirmation screen according to a third embodiment.

FIG. 13 is a diagram illustrating an example of an update time limit confirmation screen 220 according to a third embodiment. Conventionally, in order to secure safety of the password, the password may be changed periodically. In such a case, in the third embodiment, when the registration icon 184 is selected on the registration screen 180 and the password is registered, the update date of expiration of time limit of the password is set according to the useful number-of-days of the password.

When the update date of expiration of time limit of the password is set, as illustrated in FIG. 13, the update time limit confirmation screen 220 for causing the user to confirm the update date of expiration of time limit of the password is displayed on the display 22.

On the update time limit confirmation screen 220, an end icon 224 is displayed in addition to a message 222 indicating the update date of expiration of time limit of the password. For example, on the update time limit confirmation screen 220, the message 222 such as "Password is registered." and "This password can be used until XX year YY month, ZZ day." is displayed. With this message 222, the update date of expiration of time limit of the password is presented to the user. For that reason, the user can recognize the update date of expiration of time limit of the password input by the user.

However, the update date of expiration of time limit of the password is set to a day before the latest date corresponding to the useful number-of-days of the password. That is, the update date of expiration of time limit of the password is set within a range that does not exceed the useful number-of-days of the password.

The end icon 224 is a software key to which the function of closing (not displaying) the update time limit confirmation screen 220 and ending the password registration application is assigned. In the update time limit confirmation screen 220, operations other than selecting the end icon 224 may not be performed.

Figure 14:
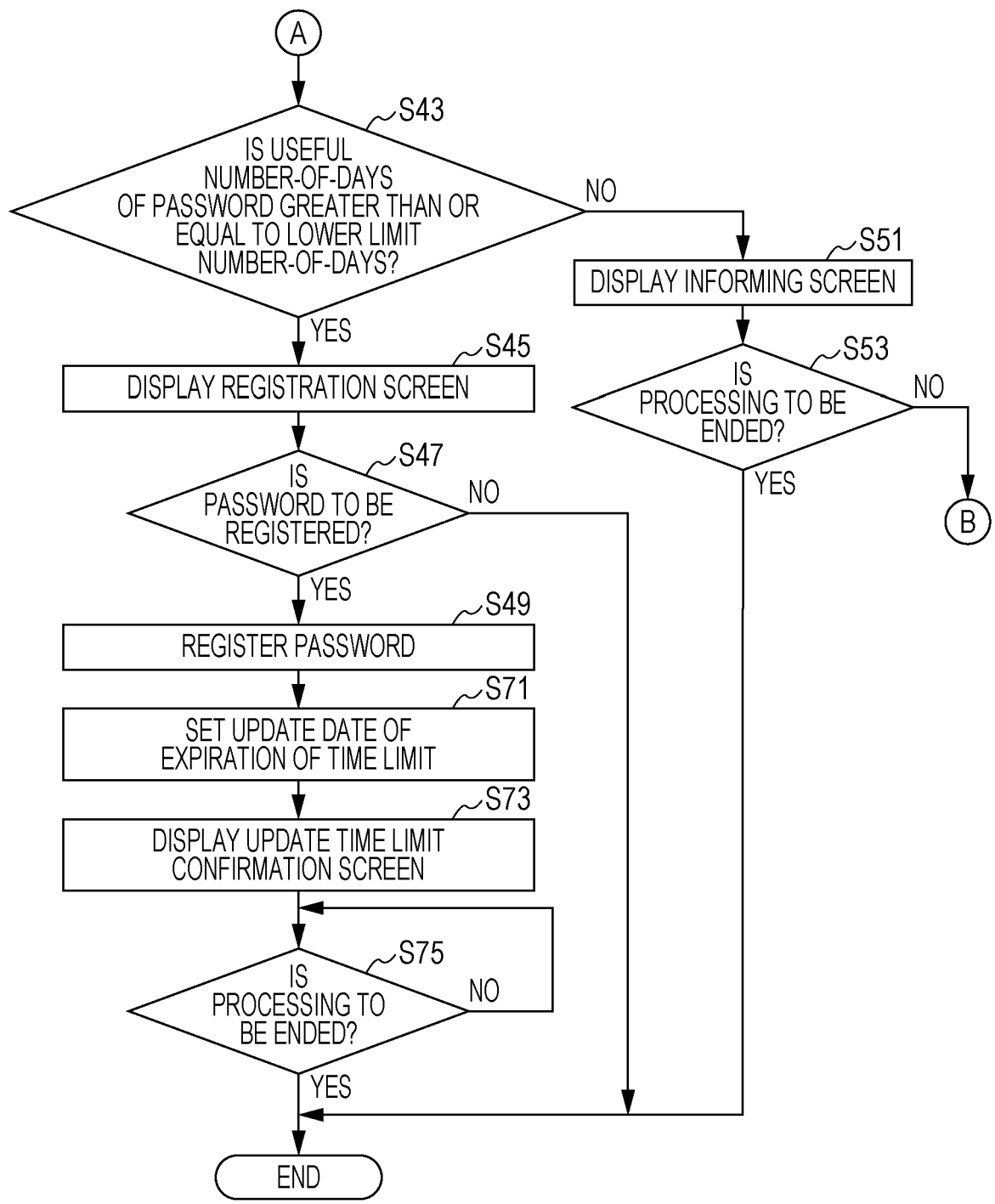
FIG. 14 is a flowchart illustrating an example of information processing according to the third embodiment.

FIG. 14 is a flowchart illustrating an example of information processing of the CPU 12 of the information processing device 10 according to the third embodiment. In the following, although information processing of the information processing device 10 in the third embodiment will be described with reference to the flowchart, the same reference numerals are given to the same processing as the information processing described in the second embodiment, and the description of redundant contents will be omitted or briefly made.

As illustrated in FIG. 14, when information processing is started, the CPU 12 registers a password in step S49, sets the update date of expiration of time limit of the registered password in step S71, displays the update time limit confirmation screen 220 on the display 22 in step S73, and it is determined whether or not to end information processing, in step S75. Here, it is determined whether or not the end icon 224 is selected on the update time limit confirmation screen 220.

When the determination result in step S75 is "NO", that is, in a case where the end icon 224 is not selected, processing returns to the same step S75. On the other hand, when the determination result in step S75 is "YES", that is, in a case where if the end icon 224 is selected, information processing is ended.

According to the third embodiment, since the update date of expiration of time limit of the registered password is set and the user is prompted to confirm the update date of expiration of time limit of the password, in a case where the password is periodically changed, the user can recognize the update date of expiration of time limit of the registered password.

According to the third embodiment, since the update date of expiration of time limit of the password is set within a range not exceeding the useful number-of-days of the password, it is possible to prevent a password having a low safety level from being set with respect to the length of the use period of the password.

Fourth Embodiment

Since the information processing device 10 of the fourth embodiment is the same as the information processing device 10 of the first embodiment except that in a case where data with a password is stored, a storage date of expiration of time limit of the data is set, contents different from those of the first embodiment will be described, and redundant description will be omitted.

Conventionally, when data with a password is stored, data with a password may be automatically deleted after the lapse of a predetermined period of time. In such a case, in the fourth embodiment, a password for opening data with a password is registered and the useful number-of-days of the password is calculated. Then, the storage date of expiration of time limit (date of deletion) of data is set according to the calculated useful number-of-days of the password. However, the storage date of expiration of time limit of data is set to a day before the latest date corresponding to the useful number-of-days of the password. That is, the storage date of expiration of time limit of data is set within a range that does not exceed the useful number-of-days of the password.

Data with a password may be stored in the HDD 24 of the information processing device 10 or may be stored in a storing unit of an external computer (for example, a server) that the information processing device 10 can access via the network.

For example, when data with a password is stored in the HDD 24 of the information processing device 10, the CPU 12 of the information processing device 10 reads the password associated with data from the HDD 24. In a case where data with a password is stored in an external computer, the CPU 12 of the information processing device 10 accesses the external computer to acquire the password associated with data.

When a storage date of expiration of time limit of data is set, the storage date of expiration of time limit of data is notified to the user who stored the data. For example, in a case where the data is stored in the HDD 24 of the information processing device 10, a notification screen (not illustrated) for notifying the storage date of expiration of time limit of the data is displayed on the display 22. Also, in a case where data is stored in the external computer from the information processing device 10 via the network, the notification screen is displayed on the display 22.

In a case where the storage date of expiration of time limit of data has elapsed, the data is deleted. The user may be notified of the storage date of expiration of time limit of data again, after the lapse of a predetermined period of time since data was stored, which is a day before the storage date of expiration of time limit of data.

Figure 15:
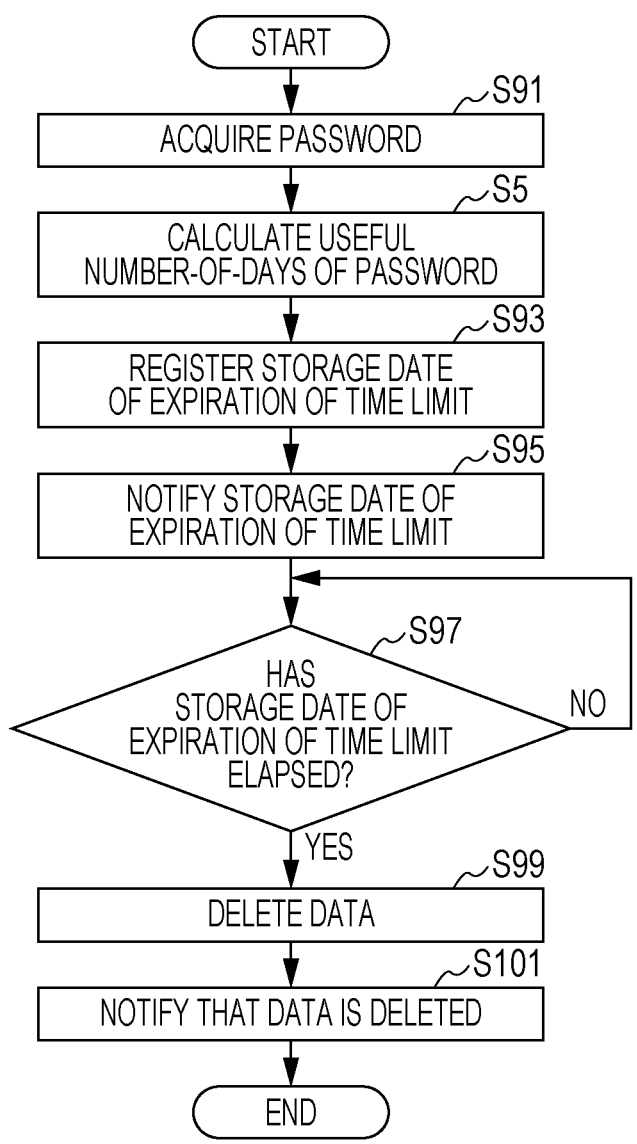
FIG. 15 is a flowchart illustrating an example of information processing according to a fourth embodiment.

FIG. 15 is a flowchart illustrating an example of information processing of the CPU 12 of the information processing device 10 according to a fourth embodiment. In the following, although information processing of the information processing device 10 in the fourth embodiment will be described with reference to the flowchart, the same reference numerals are given to the same processing as the information processing described in the first embodiment, and the description of the redundant contents will be omitted or briefly made.

As illustrated in FIG. 15, when information processing is started, the CPU 12 acquires a password of data with a password in step S91, calculates the useful number-of-days of the acquired password in step S5, sets a storage date of expiration of time limit in step S93, and notifies the user of the storage date of expiration of time limit in step S95. Then, in step S97, it is determined whether or not the storage date of expiration of time limit has elapsed.

When the determination result in step S97 is "NO", that is, in a case where the storage date of expiration of time limit has not elapsed, processing returns to the same step S97. On the other hand, when the determination result in step S97 is "YES", that is, in a case where the storage date of expiration of time limit has elapsed, the data is deleted in the step S99, the user is notified that the data is deleted in step S101, and information processing is ended.

According to the fourth embodiment, in a case where data with a password is stored, the storage date of expiration of time limit of data is automatically set according to the useful number-of-days of the password, so that management of data compatible with convenience and safety can be performed.

According to the fourth embodiment, since the storage date of expiration of time limit of data is set within a range not exceeding the useful number-of-days of the password, it is possible to prevent a password having a low safety level from being set with respect to a length of a period of time during which data is stored.

The specific numerical values, screen configurations, and the like included in the embodiments described above are merely examples and can be appropriately changed according to an actual product.

In the embodiments described above, although the case where the information processing device 10 is a general purpose computer is described as an example, the disclosure is not limited thereto. For example, the information processing device 10 may be a multifunction peripheral (MFP) having a copy function, a printer function, a scanner function, a facsimile function, and the like, or may be another image forming device such as a copying machine (copier), a printing device (printer), and a facsimile. Further, the information processing device 10 may be a display device such as an electronic blackboard and an information display, or may be a multi-display device including a plurality of display devices.

Furthermore, the order of processing of steps of the flowchart illustrated in the embodiments described above can be appropriately changed as long as the same result can be obtained.

The present disclosure contains subject matter related to that disclosed in Japanese Priority Patent Application JP 2017-109343 filed in the Japan Patent Office on Jun. 1, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A computing device comprising:
    a first processor;
    a first non-transitory machine-readable memory storing instructions that, when executed by
    the processor, cause the computing device to:
    receive an operation of a user;
    calculate a useful number-of-days of a password, which is input by the operation of the user received by the computing device, according to a predetermined calculation condition including a search speed that is calculated based on another factor other than the password itself; and
    a display that presents the useful number-of-days calculated by the computing device to the user.

2. The computing device according to claim 1, further causing the computer device to:
    set a calculation condition according to the operation of the user received by the computing device.

3. An information processing device comprising:
    the computing device according to claim 1; and
    a register that registers a password input by computing device.

4. The information processing device according to claim 3, further comprising:
    a second processor;
    a second non-transitory machine-readable memory storing instructions that, when executed by the second processor, cause the information processing device to:
    set a lower limit number-of-days of the useful number-of-days; and
    determine whether or not the useful number-of-days calculated by the computing device reaches the lower limit number-of-days,
    wherein the register registers a password in a case where it is determined that the useful number-of-days reaches the lower limit number-of-days.

5. The information processing device according to claim 3,
    wherein the register sets an update date of expiration of time limit of the registered password in accordance with the useful number-of-days calculated by the computing device.

6. The information processing device according to claim 3, further comprising:
    a data storage that stores data associated with the password,
    wherein the register sets a storage time limit of the data according to the useful number-of-days calculated by the computing device.

7. A non-transitory computer readable storage medium storing a control program of a computing device, the control program executed by a computer of the
    computing device that receives an operation of a user and causing the computer of the computing device to:
    calculate a useful number-of-days of a password, which is input by the operation of the user, received by the computer, according to a predetermined calculation condition including a search speed that is calculated based on another factor other than the password itself; and
    a display that presents the useful number-of-days calculated by the computer to the user.

8. A control method of a computing device, comprising:
    by a computer of the computing device that receives an operation of a user,
    (a) calculating a useful number-of-days of a password, which is input by the operation of the user, received by the computer, according to a predetermined calculation condition including a search speed that is calculated based on another factor other than the password itself; and
    (b) presenting the useful number-of-days calculated in the calculating (a) to the user.

* * * * *